S. BEVAN.
GRINDING-MACHINE.
No. 7,595. Reissued April 10, 1877.
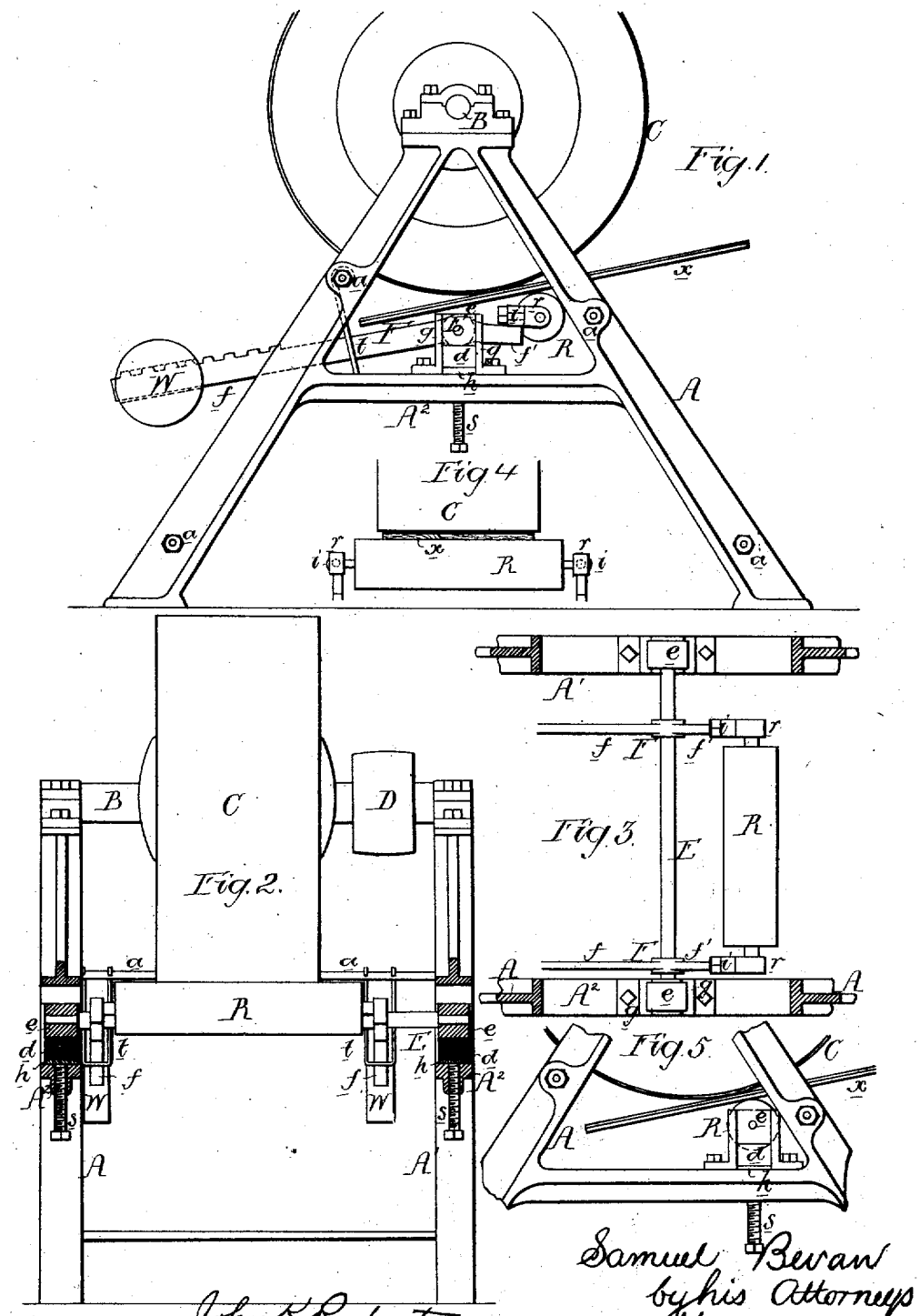
Witnesses John K. Ruperts
Harry Smith
Samuel Bevan
by his Attorneys
Howson & Howson
N. PETERS, PHOTO-LITHOGRAPHER, WASHINGTON, D. C.

UNITED STATES PATENT OFFICE.

SAMUEL BEVAN, OF PHILADELPHIA, PENNSYLVANIA, ASSIGNOR, BY MESNE ASSIGNMENTS, TO HENRY DISSTON & SONS, OF SAME PLACE.

IMPROVEMENT IN GRINDING-MACHINES.

Specification forming part of Letters Patent No. 114,098, dated April 25, 1871; reissue No. 7,595, dated April 10, 1877; application filed February 16, 1877.

*To all whom it may concern:*

Be it known that I, SAMUEL BEVAN, of Philadelphia, Pennsylvania, have invented certain Improvements in Grinding and Polishing Machines; and that the following is a full, clear, and exact description of the same.

In the accompanying drawing, Figure 1 is a side elevation of my improved grinding and polishing machine; Fig. 2, an end view, partly in section; Fig. 3, a sectional plan on the line 1 2, Fig. 1; Fig. 4, a detached view of part of the machine, and Fig. 5 a view showing a modification of my invention.

A and $A^1$ are the opposite side frames of the machine, and are connected together at suitable points by transverse rods *a a*.

B is a shaft, turning in suitable bearings at the top of the said frames, and to this shaft is secured a polishing wheel or grindstone, C, and a pulley, D, for receiving a driving-belt.

E is a spindle, adapted to bearings *e e*, which are arranged to slide in vertical guides *g g*, secured to the horizontal portion $A^2$ of the side frames, the said bearings resting upon springs *d d*, which, together with the bearings, can be adjusted vertically by set-screws *s*.

On the spindle E two levers, F F, are hung loosely, the long arms *f f* being furnished with adjustable weights *w w*, and the short arms *f' f'* being attached, by means of swivel-joints *i*, to bearings *r r* for the spindles of a roller, R, clothed with rubber or other equivalent yielding material.

Springs of metal *t*, bent to the staple-like form shown in Fig. 2, are hooked to one of the transverse rods *a*, and serve to limit the downward movement of the long weighted arms of the levers F F, and prevent the fulcrum-roller from coming in contact with the wheel.

The saw-blade or other article of thin steel to be operated on is placed on a strip or board, *x*, the outer end of which is held by the operator, and used as a lever, of which the roller R is the fulcrum, for forcing the blade against the periphery of the polishing-wheel or grindstone C, while the board with its blade is moved backward and forward, the roller permitting it to move freely. The force with which the blade is pressed against the periphery of the wheel or grindstone will depend upon the weighted arms of the levers F F, and the amount of pressure can be regulated by the adjustment of the weights.

The uniformity of pressure insured by the yielding and weighted fulcrum results in imparting a uniformly ground or polished surface to the blade or object on the board.

After the strip or board and blade have been withdrawn from between the roller R and the wheel, the weighted arms of the levers will fall until arrested in their descent by the stops *t*, which prevent the roller from coming in contact with the wheel.

It has been before remarked that the levers F F are hung loosely on the spindle E, and that the bearings of the roller R are connected to the said levers by swivel-joints *i*. This arrangement permits the roller to be depressed more at one end than the other, and to assume any angle which the lateral taper of a saw-plate may demand. (See Fig. 4.)

The machine described above is intended more especially for polishing hand-saws; but when a machine is required for cross-cut and other heavier saws, or steel plates having little or no lateral taper, the levers F F and their weights may be dispensed with, and the spindle of the fulcrum-roller may revolve in bearings adapted to the guides *g g*, and resting on rubber blocks or other equivalent springs, as shown in Fig. 5.

It will be seen that the fulcrum-roller R is situated in one side of a vertical line drawn through the axis of the grinding or polishing wheel, this being the best position for permitting the proper manipulation of the strip or hand-board *x* as a lever, with the said roller as a fulcrum.

I claim as my invention—

1. The combination of a grinding or polishing wheel, C, with a roller, R, and with a strip, *x*, carrying the object to be ground, and serving as a lever, of which the said roller R is the fulcrum.

2. The combination of the grinding or polishing wheel with a fulcrum-roller, R, clothed with rubber or other equivalent yielding material.

3. The combination of the grinding or polishing wheel with a fulcrum-roller, R, and yielding bearings of the same, which permit the said roller to accommodate itself to the plates to be ground or polished, as described.

4. The combination of the grinding or polishing wheel and the fulcrum-roller with strips for preventing the said roller from coming in contact with the said wheel.

5. The combination of the grindstone or polishing-wheel with weighted levers F and fulcrum-roller R.

6. The combination of a grinding or polishing wheel with a yielding fulcrum-roller situated at one side of a vertical line drawn through the axis of the said stone or wheel.

7. The combination of the grinding or polishing wheel with levers F F, hung loosely to a spindle, the fulcrum-roller R, and the swivel-bearings *r r* of the said roller.

In testimony whereof I have signed my name to this specification in the presence of two subscribing witnesses.

SAMUEL BEVAN.

Witnesses:

HERMANN MOESSNER,
HARRY SMITH.